Patented Mar. 14, 1950

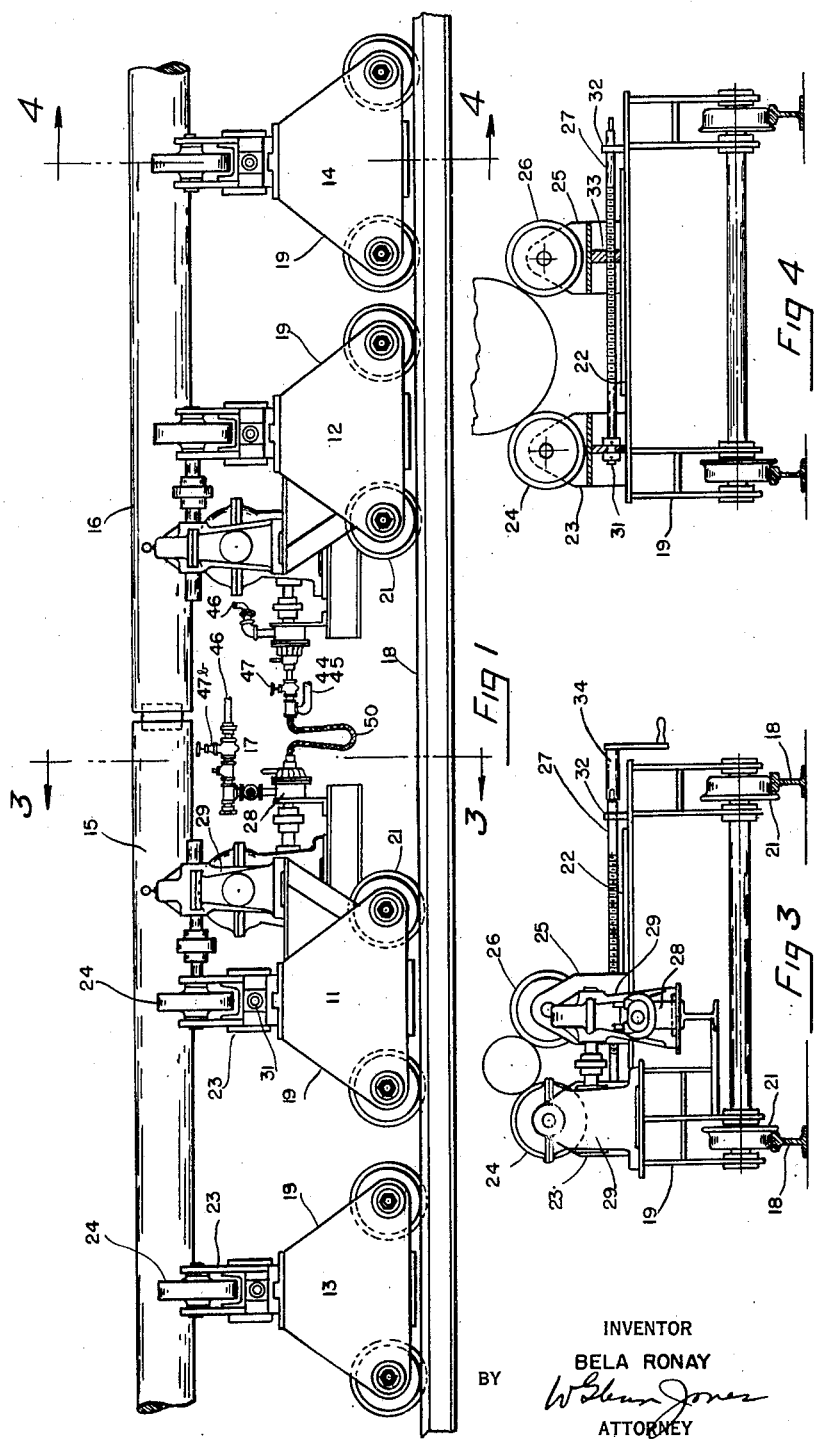

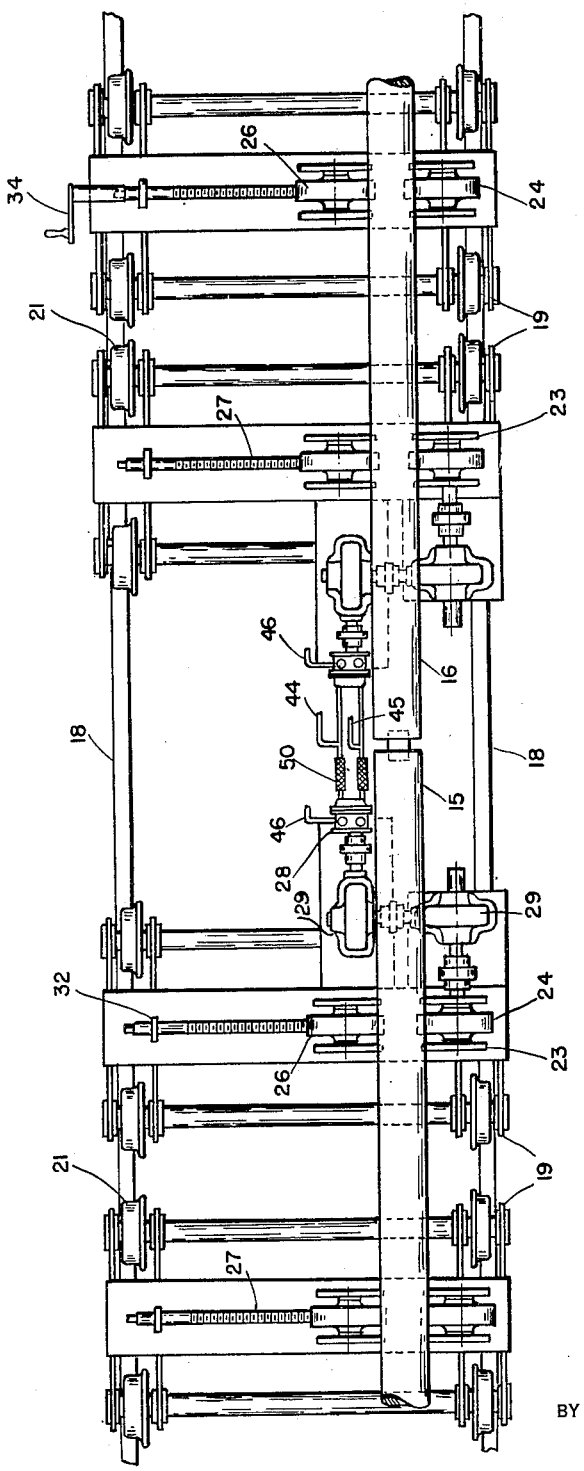

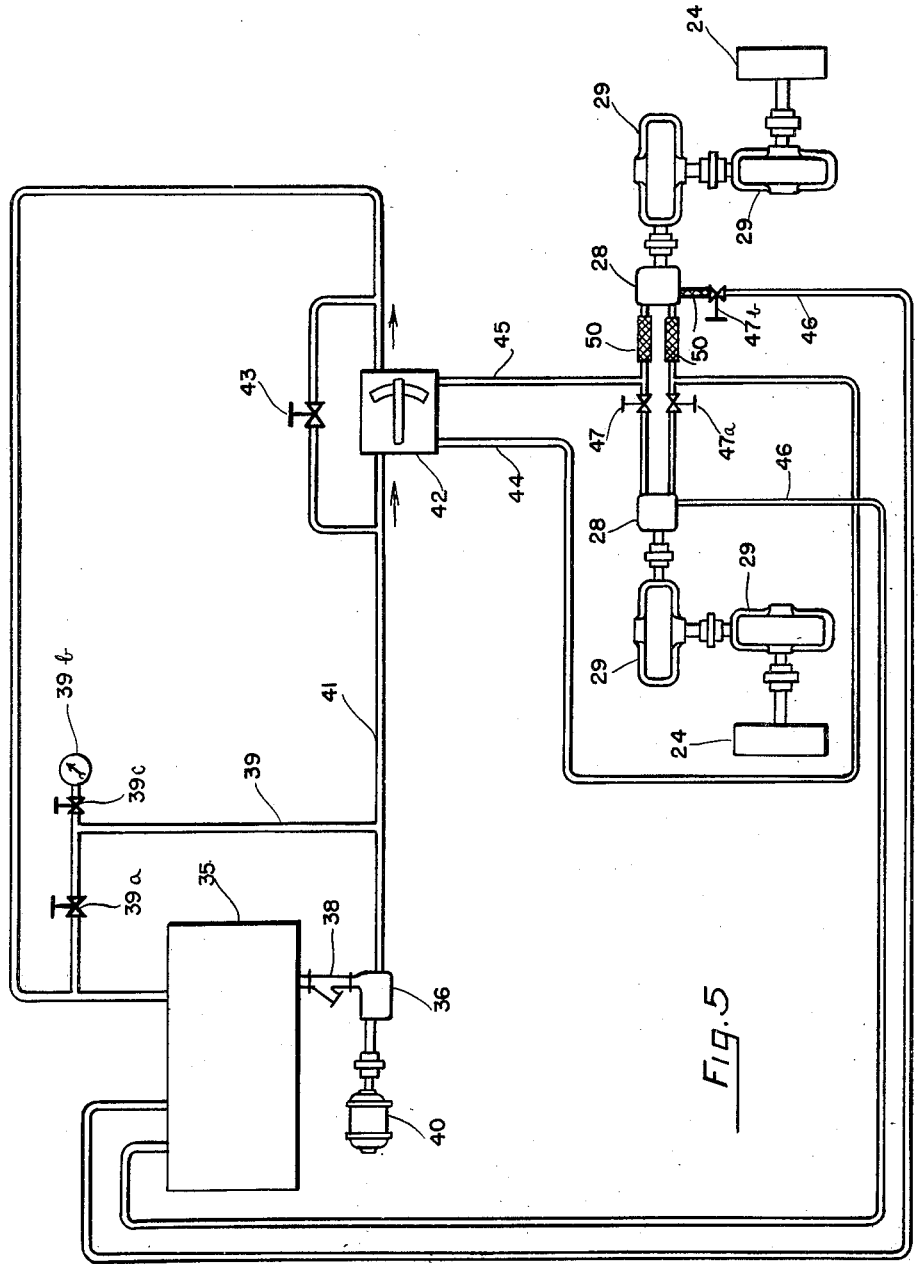

2,500,204

UNITED STATES PATENT OFFICE 2,500,204

APPARATUS FOR SUPPORTING AND MANIPULATING WORKPIECES

Bela Ronay, Annapolis, Md.

Application June 6, 1944, Serial No. 539,023

2 Claims. (Cl. 113—111)

(Granted under the act of March 3, 1883, as amended April 30, 1928; 370 O. G. 757)

This invention relates to apparatus for supporting and manipulating a plurality of work pieces for bringing them into proper position for axially joining them together and in particular is related to the support and rotation of two cylindrical elongated elements, such as the two portions of a broken propeller shaft or the like, to bring the ends into axial and circumferential alignment so that they may be joined together by welding.

One of the objects of this invention is to support and rotate one of two elements to bring it into proper alignment with the other before the two are joined together and then to rotate the elements together, at a controlled speed, in order to present progressively the successive areas at which the elements are to be joined by welding.

Another object of this invention is to provide means for reversing the rotational direction of the work pieces in order that an inspection thereof or additional work thereon may be accomplished.

A further object of this invention is to provide apparatus which is adapted to accommodate work pieces of varying lengths and diameters which are to be joined together in end to end relationship.

These and various other objects and advantages of this invention will become apparent from the following detailed description and accompanying drawings of which:

Fig. 1 is a side elevation view of the apparatus together with two work pieces supported thereon to be joined together in end to end relationship;

Fig. 2 is a plan view of the apparatus together with two work pieces supported thereon to be joined together in end to end relationship;

Fig. 3 is an elevation view of one of the work piece supporting driving units taken at 3—3 of Fig. 1;

Fig. 4 is an elevation view of one of the work piece supporting units taken at 4—4 of Fig. 1; and Fig. 5 is a schematic diagram of the hydraulic system by which the speed and the direction of rotation of the driving elements are controlled.

With reference to Fig. 1, the assembly comprises two symmetrically constructed primary work supporting units 11 and 12 each equipped with driving means, two additional symmetrically constructed primary work supporting units 13 without driving means, work pieces 15 and 16 supported thereby to be joined together by welding or the like, a hydraulic system, referred to in general by numeral 17, and a pair of spaced parallel tracks 18 on which the work supporting units are adapted to be positioned and moved in relationship to each other.

The work supporting driving unit 11, illustrated in Figs. 1 and 3, consists of a box type girder 19, flanged wheels 21 mounted in suitable bearings and attached to the bottom of the girder, a guide 22 secured to the top of the girder, a frame 23 firmly secured to one end of the girder and on which is carried a rotatable disc 24, a frame 25 supporting a rotatable disc 26, slidably mounted on the guide 22 and threadably engaged by a threaded shaft 27 adapted to be rotated for moving frame 25 in a lateral direction toward or away from frame 23, and a hydraulic motor 28 to which is coupled a pair of speed reduction units 29 which, in turn, are coupled to the discs 24. The shaft 27, mounted at one end in a swivel 31 attached to the girder 19, immediately below the fixed frame 23, and at the other end in a suitable bearing 32, passes through an extended internally threaded portion 33 of frame 25 and is adapted to be rotated manually in a clockwise or counter-clockwise direction by means of a hand crank engaging the end of the shaft adjacent to the bearing 32.

The work supporting unit 12, except for being constructed in a symmetrical manner, is identical to the unit 11, and the work supporting units 13 and 14, except for the lack of the driving means and their supports, are identical in construction to the work supporting driving units 11 and 12 respectively. The discs 24 and 26 constitute secondary supports for the work piece which is adapted to lie therebetween.

As shown schematically in Fig. 5, the hydraulic system 17, leading up to and controlling the operation of the hydraulic motors 28, consists of a tank or sump 35 containing a fluid such as water, a positive displacement pump 36 driven by a variable speed electric motor 40 and connected to the sump through pipe 38, an outlet pipe connected to the discharge side of the pump having a T connection of which one leg 39 provides for the return of a portion of the fluid to the sump through valve 39a and the other leg 41 for directing the remainder of the fluid to a speed and reversing valve 42 and a by-pass speed control valve 43, a discharge line 44 connecting valve 42 to one side of the motors 28 for driving them in one direction, a second discharge line 45 connecting valve 42 to the reversing side of the hydraulic motors 28, and two lines 46 connected to the discharge side of the motors for returning the fluid to the sump 35. The valve 42 may be of the four-way type conforming to that disclosed in United States Patent Number 1,937,607 issued December 5, 1933. An additional valve 47b on the discharge side of one of the motors 28 may be adjusted for stopping one of the motors while the other is in operation. A flexible tubing 50 is provided on the intake lines as well as the discharge line of one of the hydraulic motors so that one of the driving units may be adjusted longitudinally with respect to the other.

The construction of the speed and reversing valve 42 is of the conventional type, the details of which are so well known in the art that they need not be set forth herein and may be adjusted to supply fluid to both of the discharge lines 44 and 45 simultaneously, to one discharge line only, or to cause the fluid to by-pass both of the discharge lines 44 and 45 for return to the sump if the hydraulic motors are not to be actuated.

Three valves 47, 47a and 47b, the purpose of which will be explained later, are positioned in the lines adjacent to the hydraulic motors 28 as shown in Fig. 5. A gauge 39b, with a valve 39c adjacent thereto and the pipe 39, is provided for indicating the operating pressure of pump 36.

In order to prepare the work pieces 15 and 16, such as the two portions of a broken shaft, for joining them together by welding, they are bored out to a diameter which is slightly less than the diameter of and to a depth which is slightly greater than the length of a metallic cylindrical insert or "dutchman" which is to be placed therein, by shrink fit, for holding together the two broken shaft portions.

The work pieces having thus been processed as required, are brought into position and welded together in the following manner:

Each of the two work supporting driving units 11 and 12 is moved along the tracks 18 and spaced apart sufficiently to permit a welding operator to stand therebetween. Additional work supporting units 13 and 14 are then brought up into position at the proper distance away from their cooperating driven units in order to provide a pair of units for properly supporting the shaft portions. Each of the transversely movable discs 26 is adjusted, depending upon the diameter of the shaft to be supported, and then with the ends to be joined adjacent one another, each of the work pieces 15 and 16 is lifted by means of a crane or the like onto a pair of the supporting units.

By closing the valves 47 and 47a and opening the valves 42 and 47b in order to rotate slowly one of the hydraulic motors 28, the shaft portion supported on units 11 and 13 is brought into the exact desired end to end relationship with respect to the stationary portion to which it is to be joined and then the hydraulic motor is brought to an immediate stop.

At this point the shaft ends are heated by a torch, or any desired source of heat, until there is a sufficient expansion of the metal to cause the diameter of the two holes bored therein to exceed that of the insert or "dutchman." The insert is then placed in the thus formed opening of the shaft to be held stationary and the other shaft portion is moved with the aid of the pair of supporting units on which it rests, toward the other and into engagement with the insert so that the shaft ends come into abutting relationship with one another.

As soon as the thus connected shaft portions have cooled sufficiently in the zones of the shrink fit, welding of the seam may then be undertaken.

The work supporting driving units 11 and 12 are caused to rotate, the upper shaft surfaces moving at the desired speed away from the welding operator, by opening valves 47 and 47a and by proper adjustment and manipulation of the speed and reversing valves 43 and 42. Should it be found necessary to interrupt or reverse the rotation of the shaft, such may be conveniently accomplished by means of the valve 42.

For reasons of balance, it is of the greatest importance that perfect alignment of the two shaft portions 15 and 16 be maintained at all times during the process of joining them together so that, if during the initial assembly or during the welding operation the shaft sections tend to become misaligned, one or more of the movable discs 26 may be readily adjusted to bring the parts back into the desired relationship with respect to each other.

Upon completion of the weld the shaft may be rotated for inspection of both the weld and the alignment and then, if desired, excess weld material may be ground off by means of a hand grinding wheel or the like and the repaired shaft removed from the supporting units.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. A welding apparatus supporting a pair of elongated work pieces to be joined together in end to end relationship, comprising two primary supports one for each of said work pieces, and two secondary supports one mounted on each of said primary supports, said secondary supports extending in transverse alignment to the direction of the primary support alignment and workpiece elongation and comprising first and second rotatable discs adapted to receive the workpiece therebetween, means for adjusting transversely the first of said discs with reference to the second for each secondary support, means for rotating positively either one of the second of said discs to secure end to end adjustment of said workpieces, and means for securing simultaneous rotation of both of said second discs whereby said workpiece adjustment is maintained for welding operations.

2. A welding apparatus supporting a pair of elongated workpieces to be joined together in end to end relationship, comprising two primary supports one for each of said workpieces, means for facilitating adjustment of said primary supports relative to each other, and two secondary supports one mounted on each of said primary supports, said secondary supports extending in transverse alignment to the direction of the primary support alignment and workpiece elongation and comprising first and second rotatable discs adapted to receive the workpiece therebetween, means for adjusting transversely the first of discs with reference to the second for each secondary support, means for rotating positively either one of the second of said discs to secure end to end adjustment of said workpieces, and means for securing simultaneous rotation of both of said second discs whereby said workpiece adjustment is maintained for welding operation.

BELA RONAY.

REFERENCES CITED

The following references are of record in the file of this patent:

UNITED STATES PATENTS

| Number | Name | Date |
|---|---|---|
| 999,982 | Frazer | Aug. 8, 1911 |
| 1,056,606 | Vaughan | Mar. 18, 1913 |
| 1,382,315 | Philippi | June 21, 1921 |
| 1,538,167 | Chappell | May 19, 1925 |
| 1,639,255 | Brackett | Aug. 16, 1927 |
| 1,842,461 | Sessions | Jan. 26, 1932 |
| 1,907,702 | Anderson | May 9, 1933 |
| 1,943,527 | Hayes | Jan. 16, 1934 |
| 1,962,350 | Kane | June 12, 1934 |
| 1,962,352 | Kane | June 12, 1934 |
| 1,986,707 | Bezner | Jan. 1, 1935 |
| 2,002,877 | Barrington | May 28, 1935 |
| 2,011,037 | Cook | Aug. 13, 1935 |
| 2,047,055 | Blood | July 7, 1936 |
| 2,160,082 | Nicolson | May 30, 1939 |
| 2,193,490 | Rehse | Mar. 12, 1940 |
| 2,232,416 | Taylor et al. | Feb. 18, 1941 |
| 2,251,324 | Carlson | Aug. 5, 1941 |
| 2,279,340 | Postlewaite | Apr. 14, 1942 |
| 2,341,540 | Melhorn | Feb. 15, 1944 |
| 2,354,267 | Lytle et al. | July 25, 1944 |